May 13, 1924.

E. BUISSON

ADJUSTMENT OF JAW BRAKES

Filed April 24, 1922

1,493,803

Inventor
Eugène Buisson
by H.B. Willson &co
Attorneys

Patented May 13, 1924.

1,493,803

UNITED STATES PATENT OFFICE.

EUGÈNE BUISSON, OF PARIS, FRANCE, ASSIGNOR TO SOCIETE ANONYME FRANCAISE DU FERODO, OF PARIS, FRANCE.

ADJUSTMENT OF JAW BRAKES.

Application filed April 24, 1922. Serial No. 556,153.

*To all whom it may concern:*

Be it known that I, EUGÈNE BUISSON, a citizen of the Republic of France, and residing at Paris, Seine Department, No. 2 Rue de Chateaudun, in the Republic of France, industrial, have invented certain new and useful Improvements in the Adjustment of Jaw Brakes, of which the following is a specification.

This invention relates to a device for adjustment and for taking up the wear which is applicable to jaw-brakes and enables the adjustment to be carried out from the exterior of the brake drum without removing the wheel and in an independent manner for each jaw.

The said device preferably comprises for each of the jaws a rod whereof one end is caused to bear upon the common pivot of the jaws and the other end rests upon an eccentric axle mounted in the respective jaw. By modifying the angular position of the said eccentric axle the jaw may be caused to approach or to recede from its pivot thereby increasing or diminishing the braking action as desired. The said axle may be mounted in the jaw by screwing and in such manner as to enable the operation from the exterior through a suitable aperture, without being obliged to dismount any of the parts.

The accompanying drawing shows by way of example a form of construction of a brake according to the invention.

Figure 1:
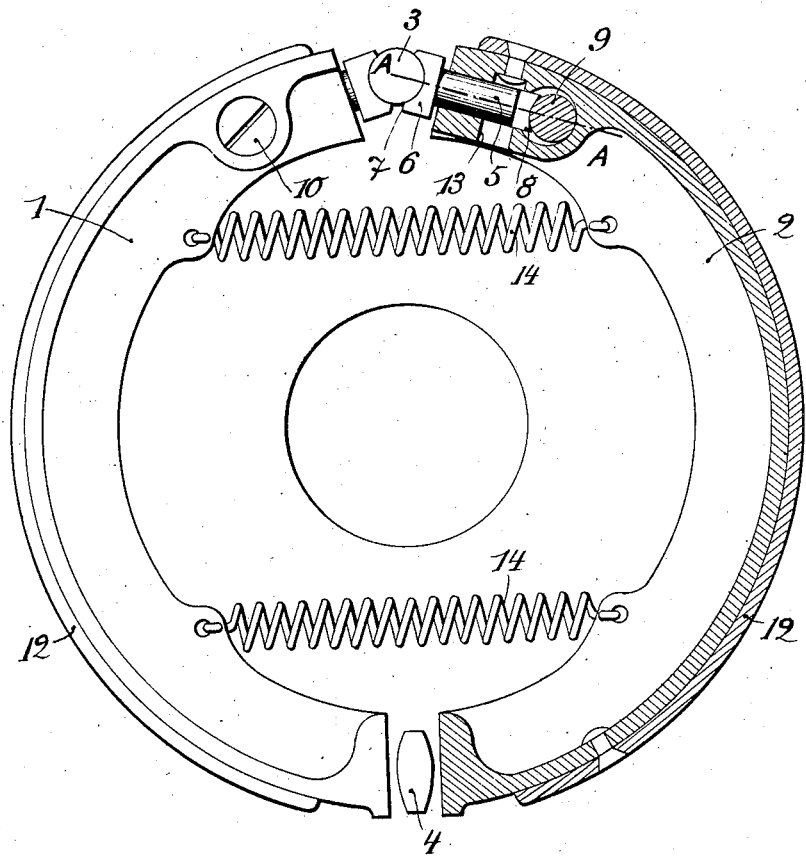
Fig. 1 is a view one-half in section and one-half in elevation of the said brake, the drum being removed.

The jaws 1 and 2 of the brake are pivoted on an axle 3 under the action of an egg-shaped cam 4 which is actuated by a handle and vehicle gear in the known manner. The jaws are returned to the inoperative position by the assembling springs 14. Within the end of each jaw adjacent the pivot 3 is slidable a rod 5 having a head 6 wherein is formed a recess 7 for the pivot 3.

The other end of the rod 5 comprises a recess 8 whereby it bears upon an axle 9 which is formed in eccentric position on a screw 10. The said screw engages the jaw and is revoluble from the exterior through an aperture provided in the plate used as a support for the brake-operating elements.

It is therefore feasible, without previous dismounting of any of the elements, and by simply turning the screw 10 in the desired sense, to move the axle 9 with reference to the centre of the said screw, thereby driving the brake shoe in question towards the periphery of the drum when the wear of the facing shall render this adjustment necessary.

By this first operation, which is equivalent to an expansion by an increase in diameter, the brake shoe is not only applied to the part of the drum adjacent the regulating element, but it will be slightly raised with a certain degree of rotation and might even come into contact with the cam 4 on the flat side. Contact thus takes place upon the whole region of the drum which can be covered by the shoe.

Inversely, with the cam 4 at the dead point, it is remarked that the brake is caused to bear on the side next the pivot whilst the side next the cam is not engaged. It might happen that during the operation of the brake, a violent shock could cause the breakage of the shoe, especially should the latter be of soft cast iron or cast steel. Such accidents are obviated by turning the screw 10 in the sense opposite the one above indicated until the action of the cam causes the shoes to come into exact contact with the interior wall of the drum. This second operation gives rise to the construction of the brake shoes by reducing the diameter of the brake.

From the preceding it is evident that the adjustment will be carried out separately for the shoes 1 and 2 to the extent and within the desired degree such as is found necessary for each, and this can be effected until the facing of the brake-shoes is entirely worn out.

In this manner it will be feasible to provide for all defects in the jaws whether with or without facing. The adjustment is the more close and exact in that the drums which are always secured to the wheels do not require dismounting but on the contrary are to remain in place. It will suffice, although this precaution is not absolutely necessary, to raise the axle by means of a jack in order to closely observe the braking pressure and to take up the wear in an exact manner.

Figure 2:
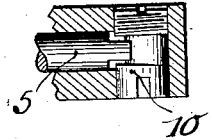
Fig. 2 is a section on the line A—A, Fig. 1.

The end alone of the screw 10 may be threaded, Fig. 2. The jaws can be provided with suitable facings 12 which may for instance be secured by rivets.

Adjacent the pivot 3, a mortise 13 may be provided in the boss serving to guide the rod 5, so that the rivets can be placed near this end of the jaw. It is obvious that the shape of the screw 10 can be modified without departing from the invention.

I claim:

A jaw brake comprising two jaws, an axle having the said jaws pivoted thereon, a rod mounted upon each end of a jaw adjacent the said pivot, the said rod being slidable in the said jaw and adapted to pivot upon the said pivot, an axle disposed upon each jaw, the said axle having an eccentric form and being revoluble in the said jaw, one end of the said rod being caused to bear upon the eccentric portion of the said axle whereby the rotation of the said axle shall effect the adjustment of the said rod.

In testimony that I claim the foregoing as my invention, I have signed my name in presence of two subscribing witnesses.

EUGÈNE BUISSON.